J. S. GRAHAM.
TENON JOINT FASTENER.
APPLICATION FILED MAR. 28, 1911.

1,001,265.

Patented Aug. 22, 1911.

Inventor
J. S. Graham

Witnesses

UNITED STATES PATENT OFFICE.

JAMES S. GRAHAM, OF MAGDALENA, TERRITORY OF NEW MEXICO, ASSIGNOR OF ONE-HALF TO OSCAR F. H. REDEMANN, OF MAGDALENA, TERRITORY OF NEW MEXICO.

TENON-JOINT FASTENER.

1,001,265.     Specification of Letters Patent.     Patented Aug. 22, 1911.

Application filed March 28, 1911. Serial No. 617,401.

*To all whom it may concern:*

Be it known that I, JAMES S. GRAHAM, citizen of the United States, residing at Magdalena, in the county of Socorro and Territory of New Mexico, have invented certain new and useful Improvements in Tenon-Joint Fasteners, of which the following is a specification.

This invention relates to an improved tenon joint fastener, and has for an object to simplify the construction of such devices so as to provide a fastener which may be easily applied without weakening the joint or necessitating the peculiar formation of any of the parts of the joint.

The invention has for another object to provide a fastener which will not split the tenon and which grips or bites into the socket member at its strongest portion, or in the inner end of the socket, and a fastener which occupies but small space so that the tenon does not have to be reduced to accommodate it and which will thereby offset the splitting of the socket member.

The invention further aims to provide a fastener of this character which holds the tenon straight in the socket by gripping the tenon at its opposite sides, and by gripping the socket member at all sides of the tenon and at its inner end.

Figure 1:
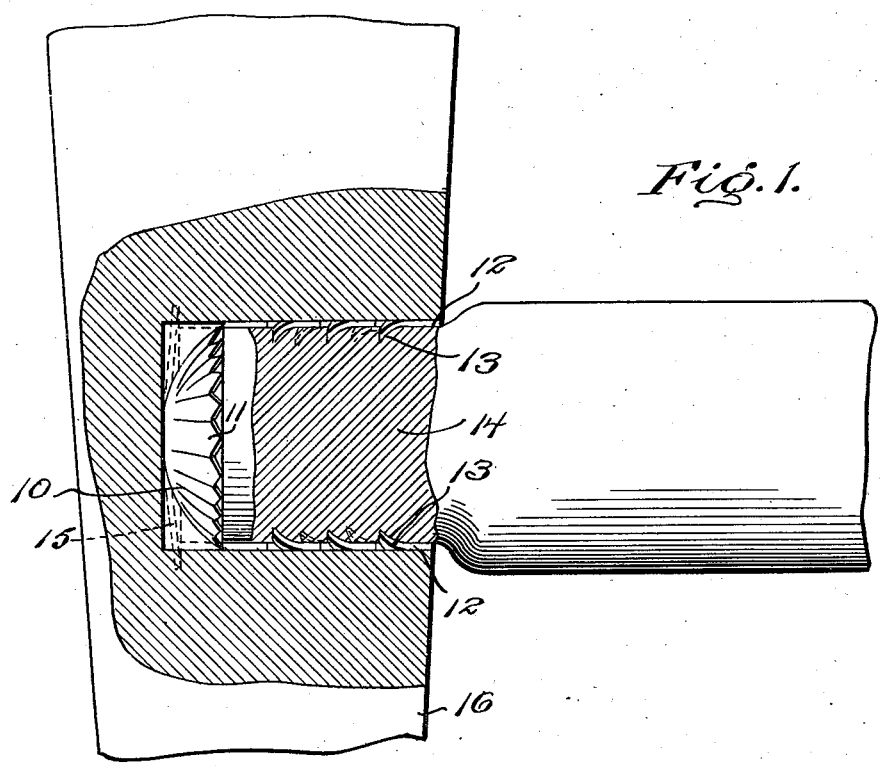
Figure 2:
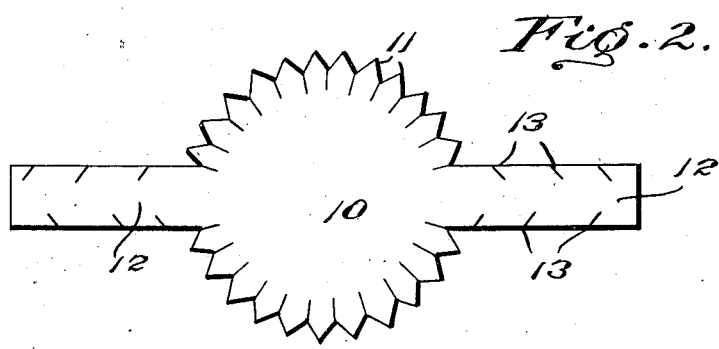

For a full understanding of the invention and the merits thereof and also to acquire a knowledge of the details of construction, reference is to be had to the following description and accompanying drawings, in which:

Figure 1 is a sectional view through a tenon joint disclosing the improved fastener applied thereto; and, Fig. 2 is a plan view of the fastener.

Corresponding and like parts are referred to in the following description and indicated in all the views of the drawing by the same reference characters.

Referring to the drawing 10 designates a disk forming the body portion of the fastener and being provided at its edge with a plurality of outstanding teeth 11. Straps 12 extend radially from the opposite sides of the disk 10 and are provided at their edges with inwardly extending prongs 13 formed in staggered relation by slitting the edges of the straps 12 and bending in the marginal edges of the same. The disk 10 is given concavo-convex form, as is disclosed in Fig. 1, to incline the teeth 11 outwardly from the center of the disk. The straps 12 are bent outwardly from the disk into parallelism, disposing the prongs 13 thereof inwardly toward one another.

In the application of the improved fastener the disk 10 is disposed against the extremity of the tenon 14, the straps 12 engaging against the opposite sides of the tenon and the spurs 13 biting into the sides of the tenon. As the disk 10 is of concavo-convex form it fits snugly into the socket 15 of the member 16 and presents its central convexed portion to the inner end of the socket 15. As the tenon 14 is driven or forced into the socket 15 the disk 10 is flattened, such action expanding the teeth 11 and forcing the same into the inner wall of the socket 15. This action holds the disk 10 from being withdrawn from the socket 15 and the prongs 13 bite into, and are held in such position against the sides of the tenon 14 by the inner wall of the socket 15 which retains the straps 12 close against the sides of the tenon 14. When a force is exerted to withdraw the tenon from the socket member 16, the teeth 11 bite into the walls of the socket 15 and hold the disk 10 from displacement while the prongs 13 bite into the sides of the tenon 14 and hold the same from displacement between the straps 12.

This device provides a simple fastener which may be stamped or otherwise formed from a single sheet of metal and given the desired curvature to admit of the application of the same to the tenon and the socket member.

Having thus described the invention, what is claimed is:

A tenon joint fastener including a concavo-convex disk having a plurality of teeth in its edge and outwardly extending straps with inturned prongs in its opposite edges.

In testimony whereof, I affix my signature in presence of two witnesses.

JAMES S. GRAHAM. [L. S.]

Witnesses:
   FRED O. GRAHAM,
   STELLA McCLURE.